US008752066B2

(12) United States Patent
Lipasek et al.

(10) Patent No.: US 8,752,066 B2
(45) Date of Patent: Jun. 10, 2014

(54) IMPLEMENTING A MIDDLEWARE COMPONENT USING FACTORY PATTERNS

(75) Inventors: John J. Lipasek, Fort Wayne, IN (US); Scott A. Schilling, Fort Wayne, IN (US); Robert Sedlmeyer, Fort Wayne, IN (US)

(73) Assignee: Raytheon Company, Waltham, MA (US)

(*) Notice: Subject to any disclaimer, the term of this patent is extended or adjusted under 35 U.S.C. 154(b) by 793 days.

(21) Appl. No.: 12/623,567

(22) Filed: Nov. 23, 2009

(65) Prior Publication Data

US 2011/0126212 A1 May 26, 2011

(51) Int. Cl.
*G06F 9/44* (2006.01)

(52) U.S. Cl.
USPC ............................ 719/313; 719/315; 719/316

(58) Field of Classification Search
USPC .......................................... 719/313, 315, 316
See application file for complete search history.

(56) References Cited

U.S. PATENT DOCUMENTS 6,106,569 A * 8/2000 Bohrer et al. ................. 717/100
6,226,692 B1 * 5/2001 Miloushev et al. ........... 719/316
6,263,213 B1 * 7/2001 Kovacs ...................... 455/550.1
6,615,199 B1 * 9/2003 Bowman-Amuah ............ 706/50
6,715,145 B1 * 3/2004 Bowman-Amuah .......... 718/101
6,742,015 B1 * 5/2004 Bowman-Amuah .......... 718/101
7,013,469 B2 * 3/2006 Smith et al. ................... 719/328
7,017,162 B2 * 3/2006 Smith et al. ................... 719/328
7,117,504 B2 * 10/2006 Smith et al. ................... 719/328
7,546,602 B2 * 6/2009 Hejlsberg et al. ............. 719/313
7,765,559 B2 * 7/2010 Chichkov et al. ............. 719/328
8,056,048 B2 * 11/2011 Stevenson et al. ............ 717/105
2004/0243663 A1 12/2004 Johanson et al.
2007/0043860 A1 * 2/2007 Pabari ........................... 709/224

OTHER PUBLICATIONS

Li et al. "A Web Service Adapter with Contract-Oriented Methodology", Eighth IEEE/ACIS International Conference on Computer and Information Science, 2009. ICIS 2009, Jun. 1-3, pp. 1144-1149.*
Blochinger et al. "Cross-platform development of high performance applications using generic programming." In Fifteenth IASTED International Conference on Parallel and Distributed Computing and Systems, pp. 654-659. 2003.*
Notification of Transmittal of the International Search Report and the Written Opinion of the International Searching Authority, or the Declaration, PCT/US2010/057194, date of mailing Apr. 7, 2011, 4 pages.
Written Opinion of the International Searching Authority, PCT/US2010/057194, date of mailing Apr. 7, 2011, 6 pages.
PCT International Preliminary Report on Patentability of the ISA dated Jun. 7, 2012; for PCT Pat. App. No. PCT/US2010/057194; 2 pages.
PCT Written Opinion of the ISA dated Jun. 7, 2012; for PCT Pat. App. No. PCT/US2010/057194; 6 pages.

* cited by examiner

*Primary Examiner* — Emerson Puente
*Assistant Examiner* — Willy W Huaracha
(74) *Attorney, Agent, or Firm* — Daly, Crowley, Mofford & Durkee, LLP

(57) ABSTRACT

In one aspect, a method to use a middleware component includes receiving a request from an application to interact with a platform using a service and using an abstract factory pattern corresponding to the service. The abstract factory pattern is associated with a first factory pattern stored in the middleware component. The method also includes determining if the first factory pattern is associated with the platform and invoking the service with the platform using the first factory pattern if the first factory pattern is associated with the platform.

20 Claims, 3 Drawing Sheets

Applications 20
Application 22a 22b
10
30
Invocation 32a
Messaging 32b
Logging 32c
Data Persistence 32d
Application Delegate 40a
Facade 48
Messaging Delegate 40b
Logging Delegate 40c
Data Access Object (DAO) 40d
Abstract Factory Pattern 42a
Abstract Factory Pattern 42b
Abstract Factory Pattern 42c
Abstract Factory Pattern 42d
Factory Pattern 44a 44b
Factory Pattern 44c 44d
Factory Pattern 44e 44f
Factory Pattern 44g 44h
Intercepting Filter 46a 46b
Windows Platform 50b
50
J2EE Platform 50a
Service Locator (e.g.; JNDI) 52
Messaging Services (e.g.; J2EE JMS) 54
Logger (e.g., Java Logger API) 56
Persistent Data Store 60a
60
60

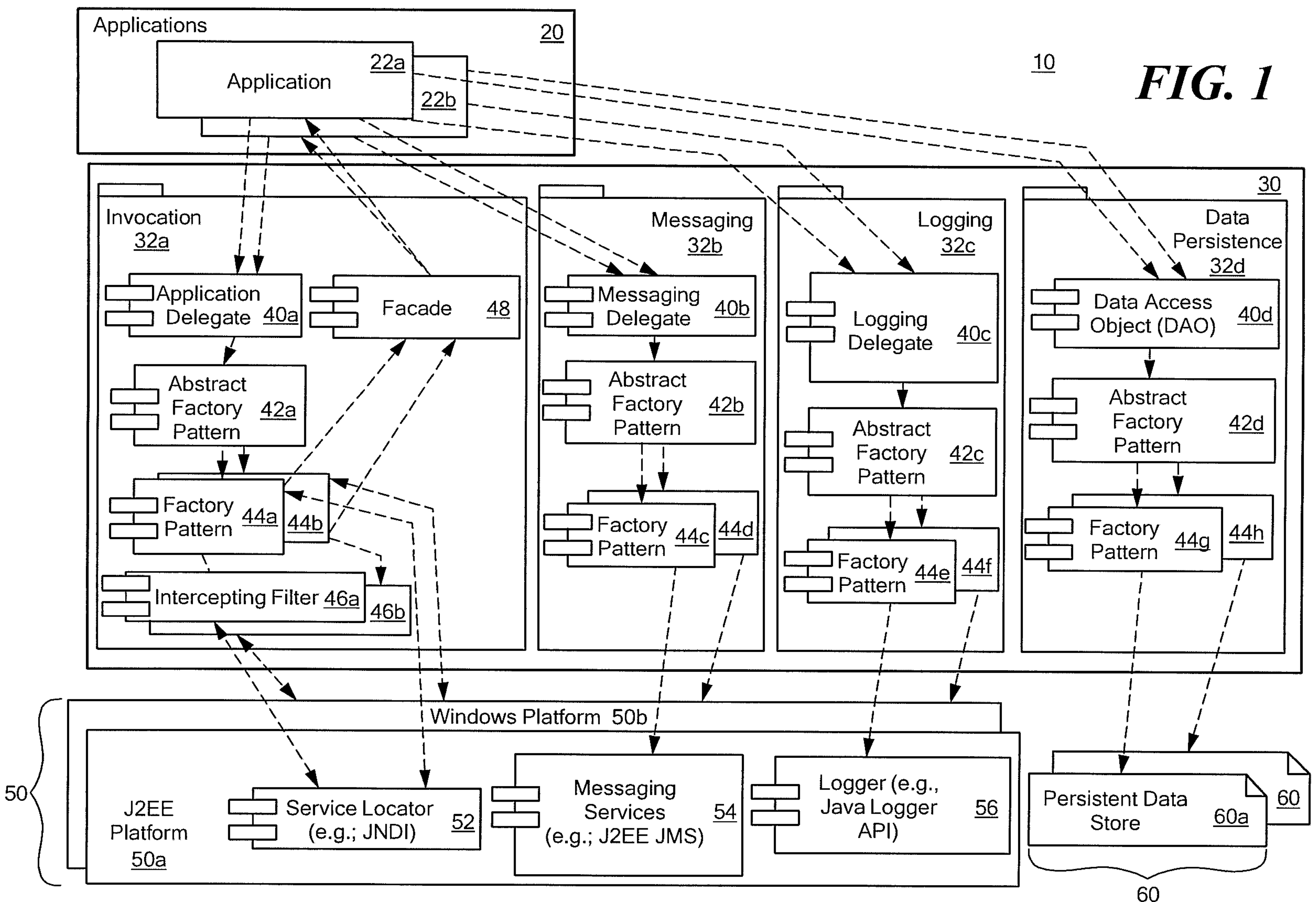

FIG. 1
10
Applications
20
Application
22a
22b
30
Invocation
32a
Application Delegate
40a
Facade
48
Abstract Factory Pattern
42a
Factory Pattern
44a
44b
Intercepting Filter
46a
46b
Messaging
32b
Messaging Delegate
40b
Abstract Factory Pattern
42b
Factory Pattern
44c
44d
Logging
32c
Logging Delegate
40c
Abstract Factory Pattern
42c
Factory Pattern
44e
44f
Data Persistence
32d
Data Access Object (DAO)
40d
Abstract Factory Pattern
42d
Factory Pattern
44g
44h
Windows Platform 50b
50
J2EE Platform
50a
Service Locator (e.g.; JNDI)
52
Messaging Services (e.g.; J2EE JMS)
54
Logger (e.g., Java Logger API)
56
Persistent Data Store
60a
60
60

IMPLEMENTING A MIDDLEWARE COMPONENT USING FACTORY PATTERNS

BACKGROUND

A middleware component is typically disposed between an operating system and applications. The middleware component allows one application to interoperate with another application. The middleware component can also allow software components or applications running on different operating systems to communicate with one another.

SUMMARY

In one aspect, a method to use a middleware component includes receiving a request from an application to interact with a platform using a service and using an abstract factory pattern corresponding to the service. The abstract factory pattern is associated with a first factory pattern stored in the middleware component. The method also includes determining if the first factory pattern is associated with the platform and invoking the service with the platform using the first factory pattern if the first factory pattern is associated with the platform.

In another aspect, an article includes a machine-readable medium that stores executable instructions to invoke a service on a platform. The instructions cause a machine to receive a request from an application to interact with the platform using the service and use an abstract factory pattern corresponding to the service. The abstract factory pattern is associated with a first factory pattern stored in a middleware component. The instruction also cause the machine to determine if the first factory pattern is associated with the platform and invoke the service with the platform using the first factory pattern if the first factory pattern is associated with the platform.

In a further aspect, an apparatus to invoke a service on a platform includes circuitry to receive a request from an application to interact with the platform using the service and to use an abstract factory pattern corresponding to the service. The abstract factory pattern is associated with a first factory pattern stored in a middleware component. The apparatus also includes circuitry to determine if the first factory pattern is associated with the platform and to invoke the service with the platform using the first factory pattern if the first factory pattern is associated with the platform.

DESCRIPTION OF THE DRAWINGS

FIG. 1 is a block diagram of an example of a middleware architecture environment using factory patterns.

DETAILED DESCRIPTION

Figure 2:
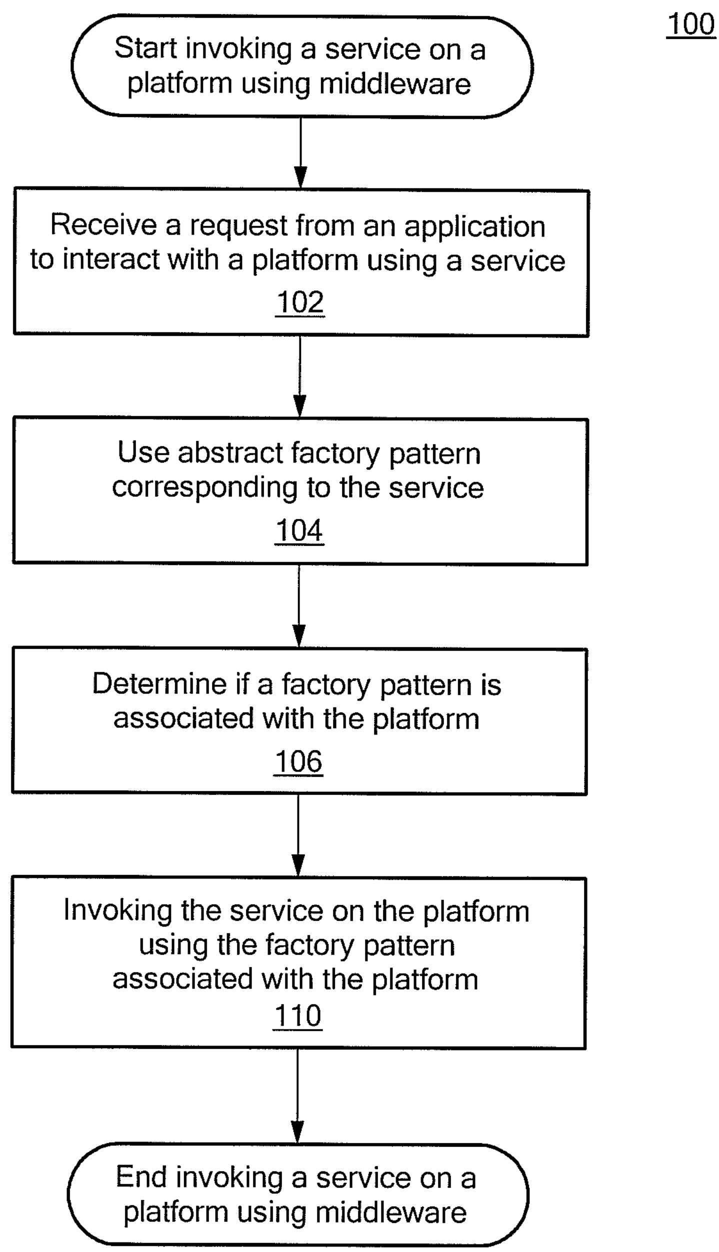
FIG. 2 is a flowchart of an example of a process to invoke a service on a platform using a middleware component using the factory patterns.

A middleware component is used to isolate services (e.g., invocation, messaging, data persistence, logging and so forth) from platforms having different operating systems (e.g., a JAVA®2, Enterprise Edition (J2EE®) platform, a MICROSOFT® WINDOWS® platform, a Common Object Request Broker Architecture (CORBA®) platform and so forth). However, there is a need for the middleware component to have easy flexibility and easy retargetability to allow applications to run on an arbitrary platform without any effects on the applications. Middleware tools currently exist but these middleware tools are not pattern based and do not have any flexibility. Also, existing middleware components are reimplemented to support additional platforms.

A middleware architecture described herein is a pattern-based middleware component that allows for easy retargetability to various platforms all while maintaining the isolation required by the services and applications. In particular, the middleware architecture described herein may be used in messaging services, data persistence services, service invocation services, logging services and so forth.

As will be shown herein, in an attempt to allow the middleware component to operate with an arbitrary platform, factory patterns were implemented. The factory patterns were not just implemented for a single platform, but for multiple platforms. Moreover, the factory patterns were implemented for each service for each platform thereby allowing the services to be isolated from one another. Thus, the middleware component easily maps to any platform. The middleware component with factory patterns allows for the ease of extension to newly developed or emerging platforms without a loss of access to existing platforms. As a result any service implemented through the middleware component will work on the emerging platforms as well as the existing platforms without modifying the services and/or applications.

Referring to FIG. 1, in one example, a middleware architecture environment 10 includes applications 20 (e.g., an application 22*a* and an application 22*b*) (sometimes referred to as business components), a middleware component 30, platforms 50 (e.g., a J2EE® platform 50*a* and WINDOWS® platform 50*b*) and persistent data stores 60 (e.g., persistent data store 60*a* and persistent data store 60*b*) fabricated by different vendors. In one example, the J2EE® platform 50*a* includes a service locator component 52 (e.g., a JAVA® Naming and Directory Interface), a messaging services component 54 (e.g., a J2EE® JAVA® Messaging Service) and a logger component 56 (e.g., a JAVA® Logger Application Programming Interface).

In prior art approaches, each of the applications 20 would have to been rewritten for each new platform (e.g., to accommodate the different operating systems). As will be shown below, in the middleware architecture 10, the applications 20 themselves do not have to be rewritten for each platform 50; but rather, additional instructions are added to the middleware component 30 in the form of factory patterns for each platform.

A factory pattern is a design pattern used in software development to encapsulate the processes used in the formation of objects that interface to the platforms. Thus, a factory pattern is associated with a particular platform. An abstract factory pattern provides a way to encapsulate a group of and invoke individual factory patterns. As will be shown herein each abstract factory pattern is associated with one of the services.

The middleware component 30 includes components used to facilitate services. For example, an invocation service component 32*a* is used to facilitate invocation services, a messaging service component 32*b* is used to facilitate messaging services, a logging service component 32*c* is used to facilitate logging services and a data persistence service component 32*d* is used to facilitate data persistence services.

The invocation service component 32*a* includes an application delegate 40*a*, an abstract factory pattern 42*a*, factory patterns 44*a*, 44*b*, intercepting filters 46*a*, 46*b* and a façade 48. The application delegate 40*a* (sometimes referred to as a business delegate) is an agreed upon or industry interface between the applications 20 and the invocation services component 32*a* for data received from the applications. The application delegate 40*a* receives a request for a platform for invocation services and invokes the abstract factory pattern 42*a*.

The abstract factory pattern 42*a* is used for invocation services and is associated with the factory patterns 44*a*, 44*b* each tied to a specific platform used in invocation services. For example, for invocation services, the factory pattern 44*a* establishes the interface to the J2EE® platform 50*a* and the factory pattern 44*b* establishes the interface to the WINDOWS® platform 50*b*. The abstract factory pattern 42*a* determines the appropriate factory pattern 44*a*, 44*b* corresponding to the requested platform.

The factory patterns 44*a*, 44*b* establish an interface with a corresponding component in the platforms 50. For example, the factory pattern 44*a* establishes an interface with the service locator component 52.

The intercepting filters 46*a*, 46*b* provide compression and/or encryption to data sent to a respective platform 50*a*, 50*b*. For example, the intercepting filter 56*a* compresses and/or encrypts data sent to the J2EE® platform 50*a* and the intercepting filter 46*b* compresses and/or encrypts data sent to the WINDOWS® platform 50*b*. The façade 48 is an interface to the applications 50 for data received from the platforms 50 and is linked (e.g., directly) to the factory patterns (e.g., factory pattern 44*a* and factory pattern 44*b*).

The messaging service component 32*b* includes a messaging delegate 40*b*, an abstract factory pattern 42*b* and factory patterns 44*c*, 44*d*. The messaging delegate 40*b* is an interface between the messaging service component 32*b* and the applications 20. The messaging delegate 40*b* receives a request for a platform for messaging services and invokes the abstract factory pattern 42*b*.

The abstract factory pattern 42*b* is used for messaging services and is associated with the factory patterns 44*c*, 44*d* each tied to a specific platform used in messaging services. For example, for messaging services, the factory pattern 44*c* establishes the interface to the J2EE® platform 50*a* and the factory pattern 44*d* establishes the interface to the WINDOWS® platform 50*b*. The abstract factory pattern 42*b* determines the appropriate factory pattern 44*c*, 44*d* corresponding to the requested platform.

The factory patterns 44*c*, 44*d* establish an interface with a corresponding component in the platforms 50. For example, the factory pattern 44*c* establishes an interface with the messaging services component 54.

The logging service component 32*c* includes a logging delegate 40*c*, an abstract factory pattern 42*c* and factory patterns 44*e*, 44*f*. The logging delegate 40*c* is an interface between the logging services component 32*c* and the applications 20. The logging delegate 40*c* receives a request for a platform for logging services and invokes the abstract factory pattern 42*c*.

The abstract factory pattern 42*c* is used for logging services and is associated with the factory patterns 44*e*, 44*f* each tied to a specific platform used in logging services. For example, for logging services, the factory pattern 44*e* establishes the interface to the J2EE® platform 50*a* and the factory pattern 44*f* establishes the interface to the WINDOWS® platform 50*b*. The abstract factory pattern 42*c* determines the appropriate factory pattern 44*e*, 44*f* corresponding to the requested platform.

The factory patterns 44*e*, 44*f* establishes an interface with a corresponding component in the platforms 50. For example, the factory pattern 44*c* establishes an interface with the logger component 56.

The data persistence service component 32*d* includes a data access object (DAO) 40*d*, an abstract factory pattern 42*d* and factory patterns 44*g*, 44*h*. The DAO 40*d* is an interface between the data persistence component 32*d* and the applications 20. The DAO 40*d* receives a request for a platform for invocation of data persistence services and invokes the abstract factory pattern 42*d*.

The abstract factory pattern 42*d* is used for data persistence services and is associated with the factory patterns 44*g*, 44*h* each tied to a specific persistent data store 60*a*, 60*b* used in data persistence services. For example, for data persistence services, the factory pattern 44*g* establishes the interface to the persistent data store 60*a* and the factory pattern 44*h* establishes the interface to the persistent data store 60*b*. The abstract factory pattern 42*d* determines the appropriate factory pattern 44*g*, 44*h* corresponding to the requested persistent data store 60*a*, 60*b*.

The abstract factory patterns 42*a*-42*d*, at runtime, load into memory the interfaces to the required platforms from the appropriate factory patterns 44*a*-44*h*. By using the abstract factory patterns 42*a*-42*d* in the middleware component, a defined platform at runtime is incorporated. Thus, if a system has three platforms to choose from, only the required middleware components (e.g.; factory patterns) are loaded into memory at runtime. To add additional platforms, one would only need to generate additional factory pattern code.

The following is an example of an abstract factory pattern:

```
public class AbstractFactory
{
    private Hashtable<String, String> daTable = null;
    private static AbstractFactory instance;
    private boolean useJ2EEPlatform = false;
    private boolean useWindowsPlatform = false;
    private boolean useCORBAPlatform = false;
    /**
     * AbstractFactory constructor.
     */
    private AbstractFactory( )
    {
                // Determine Platform to use. In this example we use
        // PlatformConfig to read a properties file in determining the
        // platform to support. This can be accomplished/implemented in any
        // of a number of methods.
                if (PlatformConfig.getInstance( ).isJ2EEPlatform( )) {
                        useJ2EEPlatform = true;
                } else if (PlatformConfig.getInstance( ).isWindowsPlatform( )) {
                        useWindowsPlatform = true;
                } else if (PlatformConfig.getInstance( ).isCORBAPlatform( )) {
                        useCORBAPlatform = true;
```

-continued

```
                }
}
/**
 * This operation returns the singleton instance of the AbstractFactory.
 *
 * @return AbstractFactory.
 */
public static AbstractFactory getInstance( )
{
                if (instance == null) {
                                instance = new AbstractFactory( );
                }
                return instance;
}
/**
 * This operation returns an object that implements the Factory Pattern,
 * DataAccessibleInterface, interface associated with one of the CSF supported
 * platforms (e.g., J2EE ®, CORBA ® or MICROSOFT ® WINDOWS ®).
 *
 * In this example, the Persistence Abstract Factory pattern retrieves the
 * Factory Pattern (e.g., DataAccessibleInterface) associated with the specific
 * interface. The dataName (String) represents the name of the business object
 * class requiring persistence.
 *
 * @param dataName
 * @return DataAccessibleInterface
 */
public DataAccessibleInterface getDataAccessible(Class dataName)
{
                DataAccessibleInterface dataAccessibleInterface = null;
                    // This code determines which platform to use when supporting data
            // Persistence.
                    if (useJ2EEPlatform) {
                          dataAccessibleInterface = (DataAccessibleInterface)
                          J2EEPersistenceFactory.getInstance( ).getDataAccessible(dataName);
                    } else if (useCORBAPlatform) {
                          dataAccessibleInterface = (DataAccessibleInterface)
                          CorbaPersistenceFactory.getInstance( ).getDataAccessible(dataName);
                    } else if (useWindowsPlatform) {
                          dataAccessibleInterface = (DataAccessibleInterface)
                          WindowsPersistenceFactory.getInstance( ).getDataAccessible(dataName);
                    }
                    return dataAccessibleInterface;
}
```

The following is an example of a factory pattern:

```
public class J2EEPersistenceFactory {
      private Hashtable<String, String> daTable = null;
      private static J2EEPersistenceFactory instance = new
      J2EEPersistenceFactory( );
      /**
       * The constructor initializes the hash table containing the
       associations
       * between Java classes and their persistent counterparts.
       */
      public J2EEPersistenceFactory ( ) {
}
      /**
       * This operation returns the singleton instance of the
       * J2EEPersistenceFactory
       *
       * @return J2EEPersistenceFactory
       */
      public static J2EEPersistenceFactory getInstance( ) {
            return instance;
      }
      /**
       * This operation returns an object that implements the
       DataAccessibleInterface
       * interface. The dataName (String) represents the name of the
       business
       * object class requiring persistence.
       *
       * @param dataName
```

-continued

```
       *
       * @return DataAccessibleInterface
       */
      public DataAccessibleInterface getDataAccessible(Class dataName) {
      }
```

Referring to FIG. 2, one example of a process to invoke a service on a platform using the middleware component 30 is a process 100. The middleware component 30 receives a request from an application (application 22*a* or application 22*b*) to interact with a platform (e.g., one of platform 50*a* or platform 50*b*) (102).

The middleware component 30 accesses an abstract factory pattern from the pool of abstract factory patterns 42*a*-42*d* corresponding to the service (104). For example, if the application 22*a* requested to perform a messaging service using J2EE® then the abstract factory pattern 42*b* determines which factory pattern from the messaging service component 32*b* to use. In another example, if the application 22*a* requested to perform a logging service using J2EE® then the abstract factory pattern 42*c* from the logging service component 32*c* is used.

The middleware component 30 determines if a factory pattern is associated with a platform (106). For example, a request to use the J2EE® using a messaging service is received and the abstract factory pattern 42*b* determines that the factory pattern 44*c* is used in the case where the factory pattern 44*c* is associated with the J2EE® platform. In another example, a request to use the J2EE® using a logging service is received and the abstract factory pattern 42*c* determines that the factory pattern 44*e* is used in the case where the factory pattern 44*e* is associated with the J2EE® platform.

The middleware component 30 invokes the service with the platform based on the factory pattern associated with the platform (110). For example, if the factory pattern 44*c* is used then the interfaces provided by the factory pattern 44*c* are used to access the messaging services component 54. In another example, if the factory pattern 44*e* is used then the interfaces provided by the factory pattern 44*e* are used to access the logging services component 56.

Figure 3:
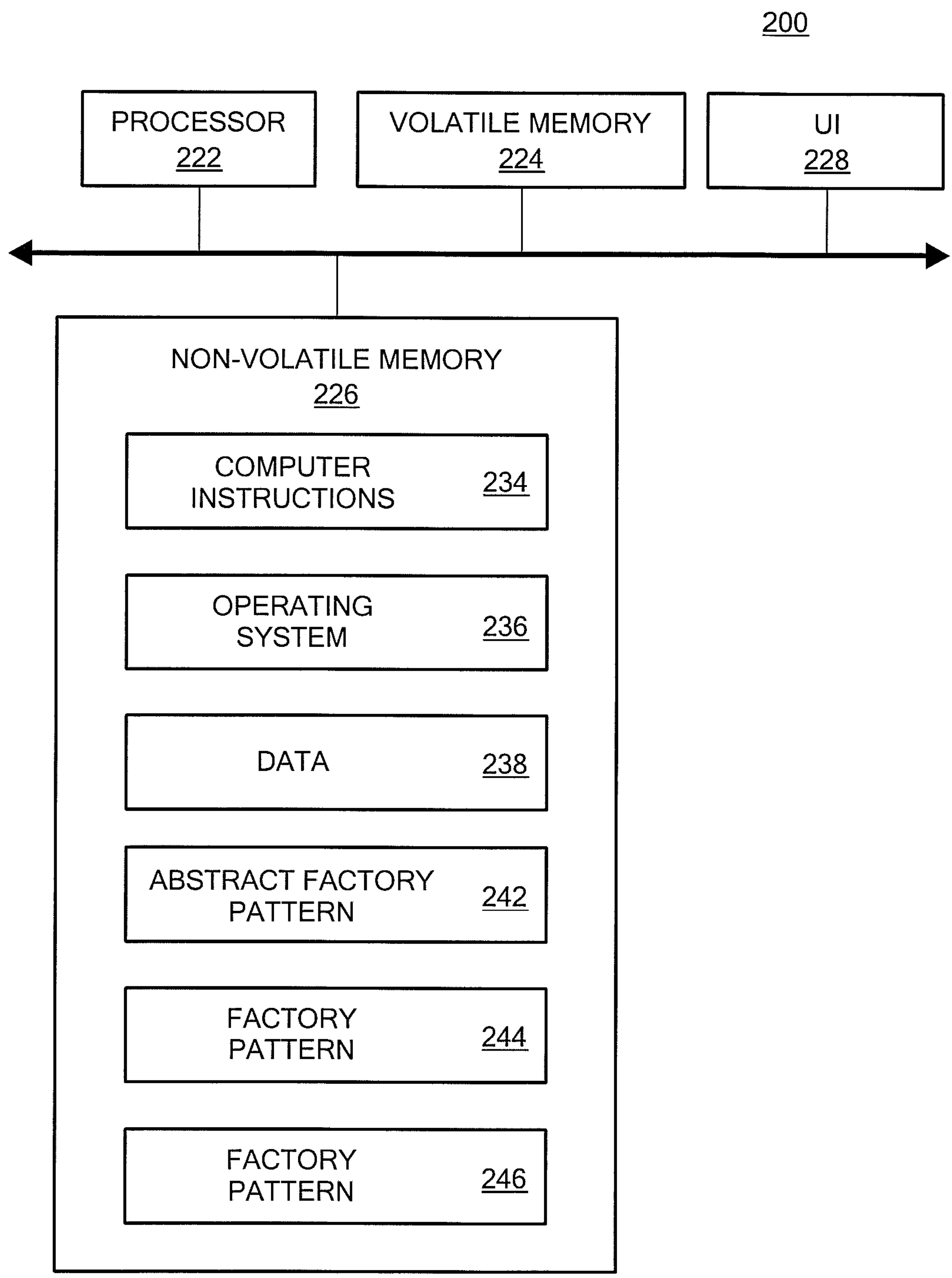
FIG. 3 is a block diagram of an example of a computer for which the process of FIG. 2 may be implemented.

Referring to FIG. 3, an example of a computer to provide a middleware component is computer 200. The computer 200 includes a processor 222, a volatile memory 224, a non-volatile memory 226 (e.g., a hard disk) and a user interface (UI) 228 (e.g., a mouse, a touch screen, a keyboard, a display, for example). The non-volatile memory 226 stores computer instructions 234, an operating system 236 and data 238. The non-volatile memory 226 also includes an abstract factory pattern 242, a factory pattern 244 associated with a first platform, a factory pattern 246 associated with a second platform and an intercepting filter 248 (e.g., the intercepting filters 46*a*, 46*b*). In one example, the computer instructions 234 are executed by the processor 222 out of volatile memory 224 to perform all or part of the processes described herein (e.g., the process 100).

The processes described herein (e.g., the process 100) are not limited to use with the hardware and software configuration shown in FIG. 3; they may find applicability in any computing or processing environment and with any type of machine or set of machines that are capable of running a computer program. The processes described herein may be implemented in hardware, software, or a combination of the two. The processes described herein may be implemented as a set or subset of services in computer programs executed on programmable computers/machines that each includes a processor, a storage medium or other article of manufacture that is readable by the processor (including volatile and non-volatile memory and/or storage elements), at least one input device, one or more output devices, and a network connection. Program code may be applied to data entered using an input device to perform the processes described herein and to generate output information.

The system may be implemented, at least in part, via a computer program product, (e.g., in a machine-readable storage device), for execution by, or to control the operation of, data processing apparatus (e.g., a programmable processor, a computer or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein (e.g., the process 100). The processes described herein may also be implemented as a machine-readable storage medium, configured with a computer program, where upon execution, instructions in the computer program cause the computer to operate in accordance with the processes.

The processes described herein are not limited to the specific embodiments described. For example, the process 100 is not limited to the specific processing order of FIG. 2. Rather, any of the processing blocks of FIG. 2 may be re-ordered, combined or removed, performed in parallel or in serial, as necessary, to achieve the results set forth above.

The processing blocks in FIG. 2 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to use a middleware component comprising service components to facilitate a plurality of services, the method comprising:

providing the service components, a service component facilitating a respective one of the plurality of services comprising a messaging service, an invocation service, a logging service and a persistence data service, each service component comprising an abstract factory pattern and a delegate configured to receive a request for a platform from an application and to invoke the abstract factory pattern;

receiving the request from the application to interact with a platform using a first service of the plurality of services;

using an abstract factory pattern stored in a first service component of the service components to encapsulate a plurality of factory patterns that enable access to more than one platform, the first service component facilitating the first service, the plurality of factory patterns comprising a first factory pattern, each of the plurality of factory patterns associated with a corresponding one platform;

determining if the first factory pattern is associated with the platform; and invoking the first service with the platform using the first factory pattern if the first factory pattern is associated with the platform.

2. The method of claim 1 wherein receiving the request from the application to interact with the platform using the first service comprises receiving a request from an application to interact with a platform using the messaging service.

3. The method of claim 1 wherein receiving the request from the application to interact with the platform using the first service comprises receiving a request from an application to interact with a platform using the invocation service.

4. The method of claim 1 wherein receiving the request from the application to interact with the platform using the first service comprises receiving a request from an application to interact with a platform using the logging service.

5. The method of claim 1 wherein receiving the request from the application to interact with the platform using the first service comprises receiving a request from an application to interact with a platform using the persistence data service.

6. The method of claim 1 wherein the plurality of factory patterns are configured to facilitate interaction with at least two of: JAVA® 2, Enterprise Edition (J2EE®), MICROSOFT® WINDOWS®, Common Object Request Broker Architecture (CORBA®), Sun Solaris, Linux, HP Solaris, Mac OS, and System of Systems Common Operation Environment (SOSCOE) platforms.

7. The method of claim 1 wherein the platform is a first platform, the request is a first request and the plurality of factory patterns comprises a second factory pattern and further comprising:

receiving a second request from the application to interact with a second platform different from the first platform using the first service;

determining if the second factory pattern is associated with the second platform; and using the first service with the second platform if the second factory pattern is associated with the second platform.

8. The method of claim 1 wherein the abstract factory pattern is a first abstract factory pattern and the request is a first request and further comprising:

receiving a second request from the application to interact with the platform using a second service;

using a second abstract factory pattern stored in a second service component of the service components to encapsulate a second plurality of factory patterns that enable access to more than one platform, the second service component facilitating the second service, the second plurality of factory patterns comprising a second factory pattern, each of the second plurality of factory patterns associated with a corresponding one platform;

determining if the second factory pattern is associated with the platform; and using the second service with the platform if the second factory pattern is associated with the platform.

9. An article comprising a non-transistory machine-readable medium that stores executable instructions to invoke a first service on a platform using a middleware component comprising service components, a service component facilitating a respective one of a plurality of services comprising a messaging service, an invocation service, a logging service and a persistence data service, each service component comprising an abstract factory pattern and a delegate configured to receive a request for a platform from an application and to invoke the abstract factory pattern, the instructions causing a machine to:

receive the request from the application to interact with the platform using the first service;

use an abstract factory pattern stored in a first service component of the service components to encapsulate a plurality of factory patterns that enable access to more than one platform, the first service component facilitating the first service, the plurality of factory patterns comprising a first factory pattern, each of the plurality of factory patterns associated with a corresponding one platform;

determine if the first factory pattern is associated with the platform; and invoke the first service with the platform using the first factory pattern if the first factory pattern is associated with the platform.

10. The article of claim 9 wherein the instructions to receive the request from the application to interact with the platform using the first service comprises instructions to receive a request from an application to interact with a platform using one of a messaging service, an invocation service, a logging service and a persistence data service.

11. The article of claim 9 wherein the plurality of factory patterns are configured to facilitate interaction with at least two of: of JAVA® 2, Enterprise Edition (J2EE®), MICROSOFT® WINDOWS®, Common Object Request Broker Architecture (CORBA®), Sun Solaris, Linux, HP Solaris, Mac OS, and System of Systems Common Operation Environment (SOSCOE) platforms.

12. The article of claim 9 wherein the request is a first request and the plurality of factory patterns comprises a second factory pattern and further comprising instructions causing the machine to:

receive a second request from the application to interact with a second platform different from the first platform using the first service;

determine if the second factory pattern is associated with the second platform; and use the first service with the second platform if the second factory pattern is associated with the second platform.

13. The article of claim 9 wherein the abstract factory pattern is a first abstract factory pattern and the request is a first request and further comprising instructions causing a machine to:

receive a second request from the application to interact with the platform using a second service;

use a second abstract factory pattern stored in a second service component of the service components to encapsulate a second plurality of factory patterns that enable access to more than one platform, the second service component facilitating the second service, the second plurality of factory patterns comprising a second factory pattern;

determine if the second factory pattern is associated with the platform; and use the second service with the platform if the second factory pattern is associated with the platform.

14. An apparatus to invoke a first service on a platform, the apparatus comprising a middleware component comprising service components, each service component facilitating a respective one of a plurality of services comprising a messaging service, an invocation service, a logging service and a persistence data service, each service component comprising an abstract factor pattern and a delegate configured to receive a request for a platform from an application and to invoke the abstract factory pattern, the middleware component comprising:

circuitry configured to:

receive the request from the application to interact with the platform using the first service of the plurality of services;

use an abstract factory pattern stored in a first service component of the service components to encapsulate a plurality of factory patterns that enable access to more than one platform, the first service component facilitating the first service, the plurality of factory patterns comprising a first factory pattern, each of the plurality of factory patterns associated with a corresponding one platform;

determine if the first factory pattern is associated with the platform; and invoke the first service with the platform using the first factory pattern if the first factory pattern is associated with the platform.

15. The apparatus of claim 14 wherein the circuitry comprises at least one of a processor, a memory, programmable logic and logic gates.

16. The apparatus of claim 14 wherein the circuitry to receive the request from the application to interact with the platform using the first service comprises circuitry to receive a request from an application to interact with a platform using the first service component to facilitate one of a messaging service, an invocation service, a logging service and a persistence data service.

17. The apparatus of claim 14 wherein the plurality of factory patterns are configured to facilitate interaction with at least two of: JAVA® 2, Enterprise Edition (J2EE®), MICROSOFT® WINDOWS®, Common Object Request Broker Architecture (CORBA®), Sun Solaris, Linux, HP Solaris, Mac OS, and System of Systems Common Operation Environment (SOSCOE) platforms.

18. The apparatus of claim 14 wherein the request is a first request and the abstract factory pattern is associated with a second factory pattern and further comprising circuitry to:

receive a second request from the application to interact with a second platform different from the first platform using the first service;

determine if the second factory pattern is associated with the second platform; and use the first service with the second platform if the second factory pattern is associated with the second platform.

19. The apparatus of claim 14 wherein the abstract factory pattern is a first abstract factory pattern and the request is a first request and further comprising circuitry to:

receive a second request from the application to interact with the platform using a second service;

use a second abstract factory pattern stored in a second service component of the service components to encapsulate a second plurality of factory patterns that enable access to more than one platform, the second service component facilitating the second service, the second plurality of factory patterns comprising a second factory pattern;

determine if the second factory pattern is associated with the platform; and use the second service with the platform if the second factory pattern is associated with the platform.

20. The apparatus of claim 14, wherein a service component to facilitate the invocation service further comprises an intercepting filter configured to provide at least one of compression or encryption to data sent to a platform.

* * * * *